Figure 1:
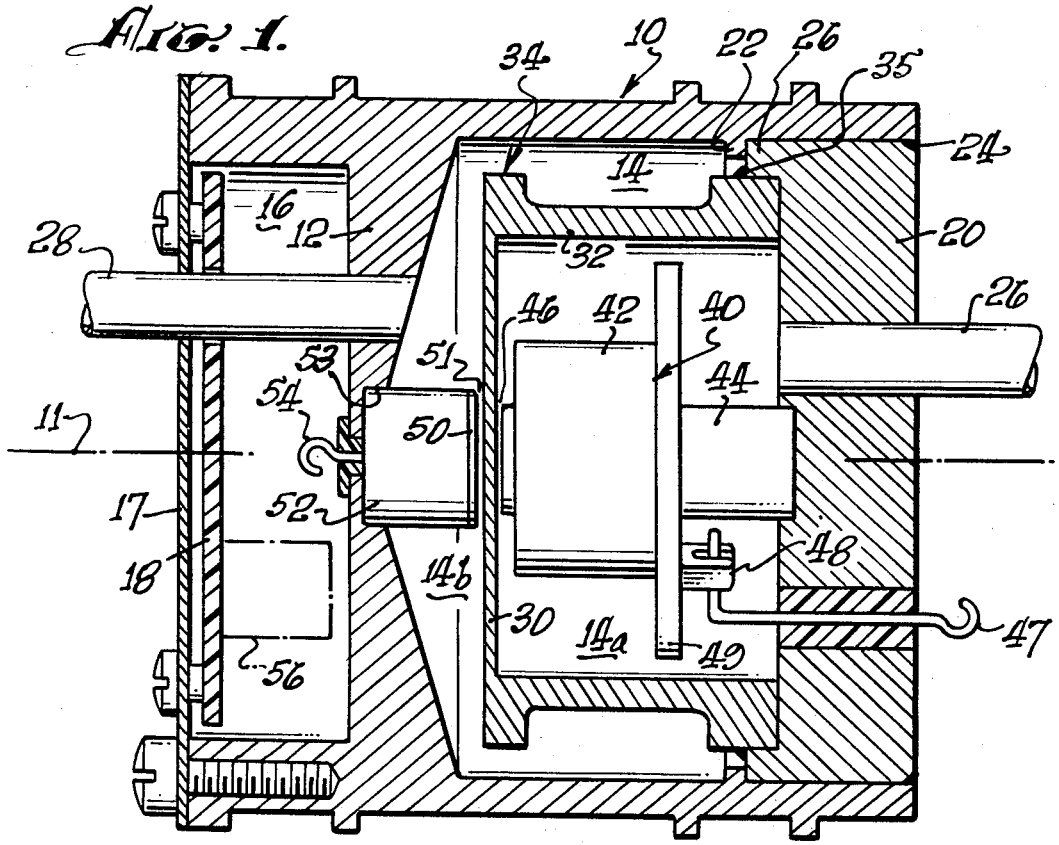

United States Patent [19]
Feuer et al.

[11] 3,762,223
[45] Oct. 2, 1973

[54] DIGITAL PRESSURE TRANSDUCER

[75] Inventors: Robert Feuer, Wayne; Donald A. Ball, Warren, both of N.J.

[73] Assignee: Conrac Corporation, New York, N.Y.

[22] Filed: Sept. 10, 1971

[21] Appl. No.: 179,473

[52] U.S. Cl. .............................. 73/398 C, 73/407 R
[51] Int. Cl. ............................................. G01l 9/12
[58] Field of Search ...................... 73/398 C, 398 R, 73/406, 407 R

[56] References Cited
UNITED STATES PATENTS

| | | | |
|---|---|---|---|
| 2,796,863 | 6/1957 | Von Wittern | 73/398 R |
| 3,503,263 | 3/1970 | Intraub | 73/386 |
| 3,668,930 | 6/1972 | Strauss | 73/386 |
| 3,295,360 | 1/1967 | Dimeff | 73/398 C |
| 3,425,281 | 2/1969 | Barz | 73/398 C |
| 3,071,725 | 1/1963 | McWaid | 73/398 R |
| 3,595,069 | 7/1971 | Fowler | 73/67.2 |

*Primary Examiner*—Donald O. Woodiel
*Attorney*—Charlton M. Lewis

[57] ABSTRACT

Fluid pressure is sensed by applying it differentially to a diaphragm, causing the diaphragm to vibrate at a natural frequency, and sensing the stressing of the diaphragm in terms of the resulting change in the natural frequency. The frequency of vibration is measured essentially by counting cycles and offsetting the count to introduce a reference pressure. Improved accuracy is obtained by forming the diaphragm of preferred magnetic materials having low temperature dependence of elasticity.

4 Claims, 2 Drawing Figures

INVENTORS.
ROBERT FEUER,
DONALD A. BALL,
By Charlton M Lewis

DIGITAL PRESSURE TRANSDUCER

This invention has to do with pressure transducers for sensing fluid pressure and producing an electrical signal that represents the magnitude of the pressure.

Many such pressure transducers have been described in which the pressure to be measured is applied to a diaphragm and the resulting diaphragm deflection is translated into an electrical signal. It is also common practice to sense directly the stress produced in the diaphragm, as by means of a piezoresistive element mounted on a face of the diaphragm or formed integrally in a diaphragm face. Such previous devices normally produce an output signal of analogue form, and are thus subject to the well known limitations of accuracy and reliability that are inherent in the manipulation of analogue signals.

An important object of the present invention is to provide a pressure transducer capable of producing an output signal that is inherently digital in nature. The improved accuracy and reliability of digital techniques are then available throughout the manipulation of the data.

Pressure transducers in accordance with that aspect the invention are particularly suitable for supplying pressure information to a digital computer. Since the pressure information can be initially produced in digital form, no analogue to digital conversion of the data is required.

A further object of the present invention is to provide a pressure transducer having reduced sensitivity to externally impressed accelerations.

The invention is further capable of producing pressure transducers that are substantially compensated with respect to temperature throughout a selected range of temperature variation.

Those and other objects and advantages of the invention are accomplished by causing the pressure-supporting diaphragm to vibrate at a natural frequency of vibration, typically in its fundamental mode, and by sensing the stressing of the diaphragm in terms of the resulting change in its natural frequency of vibration. The frequency of vibration is measured essentially by counting the cycles of vibration per unit of time, which is basically a digital operation and can readily be arranged to produce an output signal of digital form.

In preferred form of the invention, vibratory movement of the pressure-supporting diaphragm is sensed by an electrical circuit coupled capacitively to the diaphragm and developing an electrical signal in response to each cycle of the movement. Those signals are amplified and adjusted in phase, and are applied to a drive motor, typically of variable reluctance type, for driving the diaphragm vibration. The signals are also supplied to suitable counting and computing circuits for developing a digital difference signal that represents the departure of the actual frequency of vibration from its value for a selected reference pressure, typically zero. That digital difference signal can be further manipulated in any desired manner. In particular, it is typically converted by a suitably programmed digital computer to a form directly proportional to the applied pressure.

By utilizing capacitive coupling for sensing the diaphragm movement, the invention avoids any increase in the effective mass of the diaphragm and imposes minimum reactive loading of the diaphragm due to the electrical pickoff. Externally impressed accelerations have only negligible effect upon the measured frequency of the diaphragm vibration, especially since the measurement involves averaging over a large number of cycles.

A full understanding of the invention, and of its further objects and advantages, will be had from the following description of a preferred manner of carrying it out. The particulars of that description, and of the accompanying drawings which form a part of it, are intended only as illustration and not as a limitation upon the scope of the invention.

Figure 2:
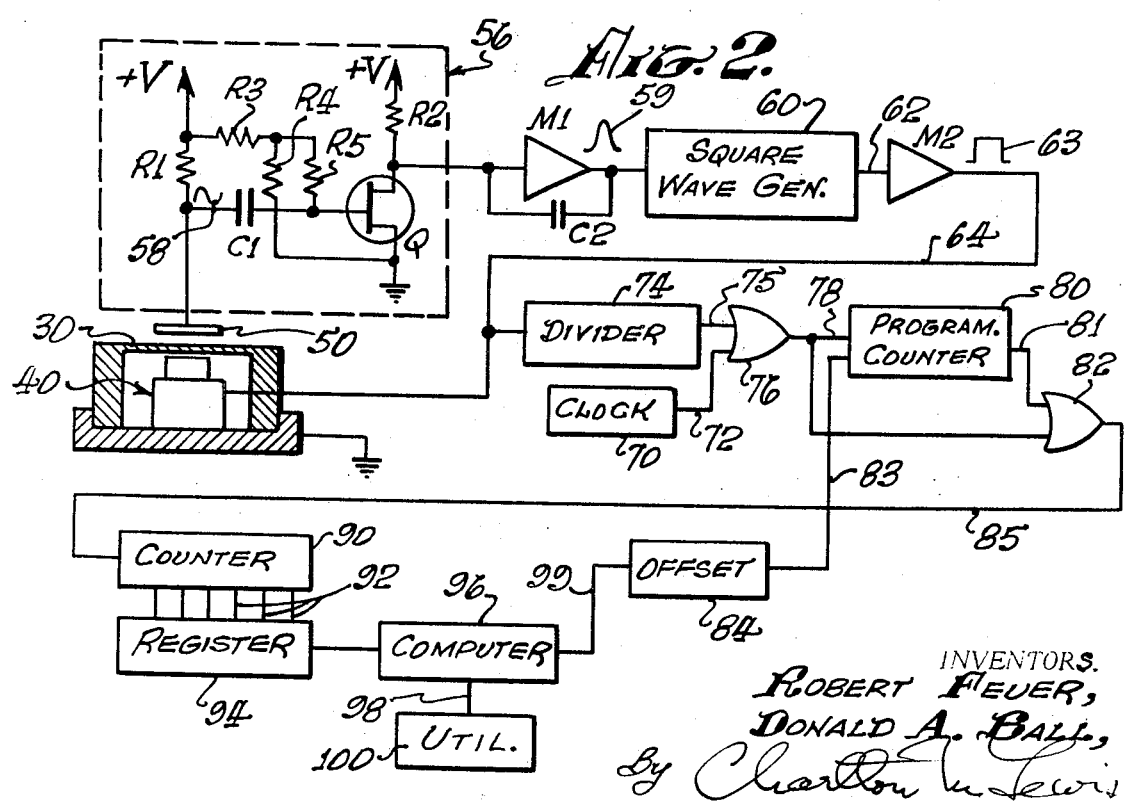

In the drawings:

FIG. 1 is a somewhat schematic axial section representing an illustrative transducer assembly in accordance with the invention; and FIG. 2 is a schematic block diagram representing an illustrative electrical system for use with the transducer assembly of FIG. 1.

An illustrative transducer in accordance with the invention is shown in axial section in FIG. 1. The cylindrical housing member 10 with the axis 11 is divided by the transverse wall 12 to form the main transducer chamber 14 and the electronics chamber 16. The latter chamber is closed by the cover plate 17, which carries on its inner face the circuit board 18. Transducer chamber 14 is closed by the rigid end wall 20, which is located axially by the internal housing flange 22 and is typically secured by solder or the like, as indicated at 24.

The diaphragm proper 30 is mounted on the inner end of the supporting sleeve 32, being preferably formed integrally with the sleeve as a unitary diaphragm member 34. Sleeve 32 is rigidly mounted at its other end on the inner face of end wall 20, on which it is axially centered by the peripheral flange 26. The joint between diaphragm member 34 and end wall 20 is sealed, as by solder, at 35, dividing transducer chamber 14 into mutually isolated inner and outer pressure chambers 14a and 14b on opposite sides of the diaphragm. Those chambers are supplied with fluid pressures from any desired respective sources via the tubes 26 and 28, which are mounted in sealed relation in bores in end wall 20 and in transverse housing wall 12, respectively. Chamber 14b is typically maintained at a selected reference pressure, ordinarily zero, while the pressure to be measured is supplied via tube 26 to chamber 14a, stressing the diaphragm increasingly with increasing value of the pressure.

Diaphragm 30 is caused to oscillate transversely of its plane and in its fundamental mode. The driving force for maintaining that oscillation is typically developed by the electromagnetic motor indicated at 40. The solenoid winding 42 is mounted on the magnetically permeable core 44, which has one end rigidly mounted coaxially on end wall 20 and the other end closely spaced at 46 from the central portion of diaphragm 30. The diaphragm, its supporting sleeve 32 and housing end wall 20 are all formed of suitable magnetically permeable material, forming with core 44 a magnetic circuit for winding 42 that is completely closed except for the air gap at 46.

Electrical connections to solenoid winding 42 are provided in any suitable manner, as by two electrical terminals, of which one is shown at 47, mounted in electrically insulated relation in end wall 20 and frictionally engaging suitable fittings 48 mounted on core 44 by means of the insulating disk 49.

Movement of diaphragm 30 is sensed by variations in the electrical capacity between the diaphragm itself and the pickoff plate 50. That plate is rigidly mounted on housing wall 12 by means of the electrically insulative, cylindrical support 52, which is typically secured and centered in a coaxial bore 53 in wall 12. Plate 50 is closely spaced from the diaphragm on the side opposite to driving motor 40 by a distance indicated at 51, which varies with the pressure applied to the diaphragm. The plate is electrically connected to the terminal 54, which projects through bore 53 into chamber 16 and is accessible for connection to the amplifying and processing circuitry carried by circuit board 18. That circuitry is indicated only schematically at 56 and preferably includes at least the elements indicated in FIG. 2. As there shown, pickoff plate 50 is charged to the normal potential + V via the blocking resistor R1. Variation in capacitance between plate 50 and grounded diaphragm 30, caused by diaphragm oscillation, then produces a corresponding periodic sinusoidal variation in the plate potential about its normal value. That sine wave pickoff signal 58 is coupled via the capacitor C1 to the gate of the negative channel field effect transistor Q, which acts primarily as a buffer. FET Q has its source grounded and its drain connected to the voltage source +V via the load resistor R2. Bias is provided by the voltage dividing resistors R3 and R4, with the current limiting resistor R5. The output from FET Q is supplied to a phase converter, shown as the amplifier M1 with capacitive feedback via C2, which adjusts the phase of the sine wave typically by approximately 90°. The resulting signal 59 is supplied as timing control to the square wave generator 60, typically comprising a zero crossing detector which controls a switching circuit in response to zero value of the sine wave. The amplitude of the resulting square wave on the line 62 is preferably set at a definite value independent of the pickoff signal, as by the saturating amplifier M2, which also acts as a buffer. The output square wave 63 from M2 is supplied via the line 64 to the winding of motor 40, with phase and amplitude suitably adjusted at M1 and M2, respectively, to produce approximately the desired amplitude of diaphragm oscillation. That oscillation amplitude is preferably much less than the range of diaphragm deflections due to the pressures to be measured. Since the Q of the diaphragm is intrinsically high, the power transmitted from motor 40 to the diaphragm is then extremely small, and the slight amplitude variation with pressure or with other factors such as temperature have negligible effect upon the frequency, which corresponds accurately to the natural frequency as modified by the pressure-imposed stress.

The pickoff signal from plate 50 is also utilized as a measure of the frequency of the diaphragm oscillation for producing an indication of the pressure that is acting on the diaphragm. If an output in analogue form is desired, the frequency signa' may be converted in any suitable manner to a current or voltage proportional to the frequency. That analogue signal may then be indicated directly or may be otherwise processed in any desired manner as a measure of the existing pressure.

It is ordinarily preferred to maintain the digital nature of the pickoff signal throughout any required manipulations and calculations. Illustrative circuitry for that purpose is shown in FIG. 2. The clock 70 produces on the line 72 a series of timing pulses of accurately maintained frequency, typically controlled by a crystal oscillator. That clock signal is gated under control of the diaphragm oscillation to produce a train of clock pulses corresponding in duration to a selected number of diaphragm oscillations. The number of pulses in each train is then directly proportional to the oscillation frequency averaged over the selected number of oscillations. That averaging produces a count of convenient magnitude and reduces the effect of any high frequency noise in the pneumatic system.

For such gating of the clock pulses, the square wave signal on line 64 is supplied to the frequency divider 74 which produces on the line 75 a control signal that continues for the selected number of diaphragm oscillations, for example 64. That control signal enables the gate 76, typically a conventional AND gate, to transmit clock pulses to the line 78. The clock frequency is typically from 10 to 100 times higher than the sensor oscillation frequency, so that the number of pulses in each transmitted train is of the order of 1,000 or more.

The gated train of clock pulses on line 78 is supplied both to the AND gate 82 and to the programmable counter 80. That counter also receives via the line 83 from the offset circuit 84 a digital signal representing a reference or offset number of counts, which is to be effectively subtracted from the pulse train count and which corresponds to the pulse train length for a selected reference pressure, typically zero. Counter 80 comprises circuitry for generating a digital signal continuously representing the number of pulses as they are received from line 78, and circuitry for comparing that signal with the reference count signal received from line 83. As soon as the pulse count becomes equal to the reference count, counter 80 produces on the line 81 a gating signal which enables gate 82. Any clock pulses in the train in excess of the reference count are transmitted by gate 82 via the line 85 to the counter 90, whose content is therefore a zero base number representing the pressure excess over the reference pressure. At the completion of each pulse train, that number is shifted in parallel via the lines 92 to the storage register 94 for transfer to any desired utilization device, shown illustratively as the digital computer 96. Computer 96 typically includes means for translating the pulse count into a digital representation directly proportional to the pressure acting on the diaphragm, taking account of the nonlinear relationship between that pressure and the diaphragm frequency. That relationship can be calculated with good accuracy from the known behavior of an oscillating diaphragm and the properties of the material from which it is made. However, it is generally preferred to determine the required relationship empirically by direct test with known pressures applied to the diaphragm, and to program computer 96 in accordance with such test results. The computer output on the line 98 is typically a digital signal representing directly the actual pressure, and is supplied to any desired utilization device, represented schematically at 100.

The offset count supplied from circuit 84 is ordinarily made to correspond to the number of pulses in the pulse train from gate 76 when the pressure in chamber 14a equals the reference pressure in chamber 14b. Especially when the reference chamber is evacuated, the offset count, once determined, is essentially constant, and may be set into circuit 84 manually and then remain fixed. On the other hand it is feasible to make the offset count correspond to any selected pressure value, which may be varied under different conditions, the programming of computer 96 being modified accordingly. Offset circuitry 84 is then preferably coupled to computer 96, as indicated by the line 99, and may be physically integrated entirely or partially in the computer. It is then feasible to program the computer to take account of such factors as temperature both in the computation performed on the count from register 94 and in the offset count that is supplied via line 83 to programmable counter 80.

Whereas the diaphragm itself and the other portions of the magnetic circuit can be made in principle from a wide variety of magnetically permeable materials, it is highly desirable to eliminate so far as possible variations in output due to temperature variations. In accordance with a further aspect of the invention, it has been discovered that remarkably effective temperature compensation is obtainable by forming the diaphragm, and preferably other parts of the magnetic circuit, of an alloy having the general properties of the iron, nickel, chromium and titanium alloy which is available commercially under the trade name "NI-SPAN-C alloy 902." The primary ingredients of that alloy are approximately 48 percent iron, 42 percent nickel, 5 percent chromium and 2.5 percent titanium. Such alloys are capable of providing a useful range of properties in response to suitably selected small modifications of the proportions of ingredients and to selected heat treatment of the product. In such alloys the thermoelastic coefficient, which is the rate of change of the modulus of elasticity with change of temperature, can be adjusted quite accurately in known manner by suitable heat treatment, the range of available values of the thermoelastic coefficient typically including zero.

Although the required heat treatment for producing a given value of thermoelastic coefficient depends somewhat upon the frequency at which the device is to operate, that dependence virtually disappears for frequencies above about 800 cycles per second. Accordingly, if the device is designed to operate at or above that frequency for all applied pressures, and if the material is treated to produce a selected low value, typically essentially zero for the thermoelastic coefficient for such relatively high frequencies, that selected value is accurately maintained over the entire range of frequencies resulting from variations in the applied pressure. Such close control over the thermoelastic coefficient of the diaphragm permits highly satisfactory compensation of any tendency of its natural frequency to vary with temperature. Temperature variation of the clearance 51 between the diaphragm and pickoff plate 50 is controlled by suitable selection and heat treatment of the material of housing 10, taking account of the heat treatment to which the diaphragm assembly itself is subjected.

In illustrative form of the invention, diaphragm 30 is about three-fourths inch in diameter and is lapped to a thickness of about 0.006 inch. With the material described above, the natural frequency of the diaphragm is then about 3,000 Hz at zero pressure differential, and increases to 6,000 Hz or more at a pressure differential of 1 atmosphere. It may be seen from those illustrative values that a wide range of diaphragm dimensions are available which lead to natural frequencies well above the threshold of 800 Hz at which the thermoelastic coefficient becomes essentially independent of frequency.

We claim:

1. A pressure transducer, comprising in combination
   a resilient diaphragm formed of an alloy having substantially zero thermoelastic coefficient for oscillation frequencies higher than a predetermined threshold value, the form of the diaphragm being such that its natural frequency of oscillation is higher than said threshold value,
   structure for applying a fluid pressure differentially to the diaphragm to stress the same transversely,
   means for driving the so stressed diaphragm to oscillate at its natural frequency,
   sensing means responsive to the diaphragm movement,
   and means for deriving from the frequency of the sensed movement an indication of the magnitude of the applied pressure.

2. A pressure transducer according to claim 1, and in which
   said diaphragm consists essentially of about 48 percent iron, 42 percent nickel, 5 percent chromium and 2.5 percent titanium and has substantially zero thermoelastic coefficient for oscillation frequencies higher than a threshold value of about 800 cycles per second,
   and the form of the diaphragm is such that its natural frequency of oscillation is higher than said threshold value.

3. A pressure transducer according to claim 2, and in which said diaphragm driving means comprise
   an electrical winding magnetically coupled to the diaphragm,
   and circuit means for producing in the winding a current that varies periodically in definite phase relation to the diaphragm oscillation.

4. A pressure transducer, comprising in combination
   a resilient diaphragm,
   structure for applying a fluid pressure differentially to the diaphragm to stress the same transversely,
   means for driving the so stressed diaphragm to oscillate at its natural frequency,
   sensing means responsive to the diaphragm movement,
   means for developing clock pulses at a constant frequency higher than the frequency of diaphragm oscillation,
   means controlled by said sensing means for counting the clock pulses during a predetermined number of diaphragm oscillations and for offsetting the pulse count by the number of clock pulses that would occur during the same number of diaphragm oscillations at a predetermined reference pressure,
   and means responsive to the offset pulse count for indicating the excess of the applied pressure over the reference pressure.

\* \* \* \* \*